United States Patent
Nguyen et al.

(10) Patent No.: US 11,436,554 B2
(45) Date of Patent: Sep. 6, 2022

(54) NETWORK COMPUTER SYSTEM TO IMPLEMENT PREDICTIVE TIME-BASED DETERMINATIONS FOR FULFILLING DELIVERY ORDERS

(71) Applicant: Uber Technologies, Inc., San Francisco, CA (US)

(72) Inventors: Thanh Le Nguyen, Brisbane, CA (US); Lei Kang, El Cerrito, CA (US); Mingshuai Gu, Menlo Park, CA (US); Hui Luan, Fremont, CA (US); Daniel Wang, San Francisco, CA (US); Xinyu Wu, San Francisco, CA (US)

(73) Assignee: Uber Technologies, Inc., San Francisco, CA (US)

( * ) Notice: Subject to any disclaimer, the term of this patent is extended or adjusted under 35 U.S.C. 154(b) by 724 days.

(21) Appl. No.: 15/802,395

(22) Filed: Nov. 2, 2017

(65) Prior Publication Data
US 2019/0130350 A1 May 2, 2019

(51) Int. Cl.
*G06Q 10/08* (2012.01)
*H04W 4/029* (2018.01)

(52) U.S. Cl.
CPC ..... *G06Q 10/0833* (2013.01); *G06Q 10/0834* (2013.01); *H04W 4/029* (2018.02)

(58) Field of Classification Search
CPC ........... G06Q 10/0833; G06Q 10/0834; G06Q 10/0832; H04W 4/029
See application file for complete search history.

(56) References Cited

U.S. PATENT DOCUMENTS

| 886,587 | A | 5/1908 | Dow |
| 6,006,159 | A | 12/1999 | Schmier |
| 6,226,570 | B1 | 5/2001 | Hahn |
| 6,553,379 | B1 | 4/2003 | Jaeger |
| 6,756,913 | B1 | 6/2004 | Ayed |
| 6,862,572 | B1 | 3/2005 | de Sylva |
| 7,064,681 | B2 | 6/2006 | Horstemeyer |

(Continued)

FOREIGN PATENT DOCUMENTS

| CN | 104751272 | 7/2015 |
| KR | 10-2014-0016053 | 2/2014 |

(Continued)

OTHER PUBLICATIONS

Eleanora Morganti, The Rise of On-Demand 'Instant Deliveries' in European Cities, Sep. 2017, Supply Chain Forum (Year: 2017).*

(Continued)

*Primary Examiner* — Resha Desai
*Assistant Examiner* — Ismail A Manejwala
(74) *Attorney, Agent, or Firm* — Dority & Manning, P.A.

(57) ABSTRACT

A network computer system selects a service provider for individual order requests by predicting an order preparation time of the respective supplier for the order request. During a time interval that precedes the order preparation time, the computer system matches an arrival time of a service provider to the respective supplier of an order request. The network computer system estimates an order delivery time for the requester based at least in part on the predicted order preparation time and on a location of the supplier relative to a location of the requester.

20 Claims, 7 Drawing Sheets

(56) References Cited

U.S. PATENT DOCUMENTS

| | | | |
|---|---|---|---|
| 7,881,986 B1* | 2/2011 | Pape | G06Q 10/087 705/28 |
| 8,315,802 B2 | 11/2012 | Brown | |
| 8,781,501 B2 | 7/2014 | Kawazoe | |
| 9,684,627 B1 | 6/2017 | Sar | |
| 9,754,331 B1 | 9/2017 | Beckelman | |
| 9,993,735 B2 | 6/2018 | Aghdaie | |
| 10,026,055 B2 | 7/2018 | Riel-Dalpe | |
| 10,029,787 B1* | 7/2018 | Lesser | B64C 39/02 |
| 10,036,641 B1 | 7/2018 | Iland | |
| 10,133,995 B1 | 11/2018 | Reiss | |
| 10,152,743 B1 | 12/2018 | Nguyen | |
| 10,156,449 B2 | 12/2018 | Colijn | |
| 10,176,448 B1 | 1/2019 | Rhodes | |
| 10,308,430 B1 | 6/2019 | Brady | |
| 10,360,616 B2 | 7/2019 | Lopez | |
| 10,366,434 B1 | 7/2019 | Belousova | |
| 10,445,672 B2 | 10/2019 | Renfroe | |
| 10,467,562 B1 | 11/2019 | Mo | |
| 10,467,563 B1 | 11/2019 | Mo | |
| 10,586,273 B1 | 3/2020 | Kohli | |
| 11,023,990 B2 | 6/2021 | Choski | |
| 2001/0047285 A1 | 11/2001 | Borders | |
| 2002/0152128 A1 | 10/2002 | Walch | |
| 2002/0188492 A1 | 12/2002 | Borton | |
| 2004/0030572 A1 | 2/2004 | Campbell | |
| 2004/0181454 A1 | 9/2004 | Manno | |
| 2004/0210621 A1 | 10/2004 | Antonellis | |
| 2004/0260470 A1 | 12/2004 | Rast | |
| 2005/0209913 A1 | 9/2005 | Wied | |
| 2007/0033087 A1* | 2/2007 | Combs | G06Q 10/06311 705/7.12 |
| 2008/0046326 A1 | 2/2008 | Horstemeyer | |
| 2008/0195428 A1 | 8/2008 | O'Sullivan | |
| 2009/0048890 A1 | 2/2009 | Burgh | |
| 2010/0153279 A1 | 6/2010 | Zahn | |
| 2011/0258134 A1 | 10/2011 | Mendez | |
| 2011/0307282 A1 | 12/2011 | Camp | |
| 2012/0191551 A1 | 7/2012 | Lutnick | |
| 2012/0203619 A1 | 8/2012 | Lutnick | |
| 2012/0253878 A1 | 10/2012 | Forstall | |
| 2012/0296770 A1 | 11/2012 | Lin | |
| 2012/0323642 A1 | 12/2012 | Camp | |
| 2013/0073327 A1 | 3/2013 | Edelberg | |
| 2013/0218727 A1 | 8/2013 | Lutnick | |
| 2013/0246207 A1 | 9/2013 | Novak | |
| 2014/0011522 A1 | 1/2014 | Lin | |
| 2014/0026054 A1 | 1/2014 | Wang | |
| 2014/0058902 A1 | 2/2014 | Taylor | |
| 2014/0108201 A1 | 4/2014 | Franchette | |
| 2014/0122301 A1 | 5/2014 | Tamassia | |
| 2014/0129302 A1 | 5/2014 | Amin | |
| 2014/0156359 A1 | 6/2014 | Morgan | |
| 2014/0164126 A1 | 6/2014 | Nicholas | |
| 2014/0172739 A1 | 6/2014 | Anderson | |
| 2014/0188750 A1 | 7/2014 | Seiler | |
| 2014/0214465 A1 | 7/2014 | L'Heureaux | |
| 2014/0229099 A1 | 8/2014 | Garrett | |
| 2014/0278635 A1 | 9/2014 | Fulton | |
| 2014/0351164 A1 | 11/2014 | Ballenger | |
| 2014/0370167 A1 | 12/2014 | Garden | |
| 2015/0142640 A1 | 5/2015 | Kneen | |
| 2015/0154538 A1 | 6/2015 | Skaaksrud | |
| 2015/0204684 A1 | 7/2015 | Rostamian | |
| 2015/0223024 A1 | 8/2015 | Abuodeh | |
| 2015/0227980 A1 | 8/2015 | Eberhardt | |
| 2015/0242810 A1 | 8/2015 | Rifai | |
| 2015/0248689 A1 | 9/2015 | Paul | |
| 2015/0262121 A1 | 9/2015 | Riel-Dalpe | |
| 2015/0301150 A1 | 10/2015 | Stuckman | |
| 2015/0310379 A1 | 10/2015 | Farrelly | |
| 2015/0323332 A1 | 11/2015 | Lord | |
| 2015/0323333 A1 | 11/2015 | Lord | |
| 2015/0323334 A1 | 11/2015 | Lord | |
| 2015/0324734 A1 | 11/2015 | Lord | |
| 2015/0324735 A1 | 11/2015 | Lord | |
| 2015/0324944 A1 | 11/2015 | Lord | |
| 2015/0347964 A1 | 12/2015 | Taylor | |
| 2015/0363843 A1 | 12/2015 | Loppatto | |
| 2016/0012391 A1 | 1/2016 | Burnett | |
| 2016/0012394 A1 | 1/2016 | Reed | |
| 2016/0019496 A1 | 1/2016 | Gorlin | |
| 2016/0027079 A1 | 1/2016 | Schoeffler | |
| 2016/0034845 A1* | 2/2016 | Hiyama | G06Q 30/0633 705/7.15 |
| 2016/0035248 A1 | 2/2016 | Gibbs | |
| 2016/0042303 A1 | 2/2016 | Medina | |
| 2016/0078516 A1 | 3/2016 | Alnuwaysir | |
| 2016/0092972 A1 | 3/2016 | Blatstein | |
| 2016/0104112 A1 | 4/2016 | Gorlin | |
| 2016/0104113 A1 | 4/2016 | Gorlin | |
| 2016/0132792 A1 | 5/2016 | Rosnow | |
| 2016/0140589 A1 | 5/2016 | Deshpande | |
| 2016/0148306 A1 | 5/2016 | Bellavance | |
| 2016/0171439 A1 | 6/2016 | Ladden | |
| 2016/0171542 A1 | 6/2016 | Fanous | |
| 2016/0171584 A1 | 6/2016 | Cao | |
| 2016/0210591 A1 | 7/2016 | Lafrance | |
| 2016/0307289 A1 | 10/2016 | Choski | |
| 2016/0328669 A1 | 11/2016 | Droege | |
| 2016/0353235 A1 | 12/2016 | Williams | |
| 2017/0024789 A1 | 1/2017 | Frehn | |
| 2017/0083862 A1 | 3/2017 | Loubriel | |
| 2017/0093803 A1 | 3/2017 | Nayshtut | |
| 2017/0116566 A1 | 4/2017 | Walton | |
| 2017/0169385 A1 | 6/2017 | High | |
| 2017/0178057 A1 | 6/2017 | Al Rifai | |
| 2017/0270794 A1 | 9/2017 | Sweeney | |
| 2017/0290345 A1 | 10/2017 | Garden | |
| 2017/0337511 A1 | 11/2017 | Shroff | |
| 2018/0025298 A1 | 1/2018 | Baggott | |
| 2018/0067620 A1 | 3/2018 | Adler | |
| 2018/0089621 A1 | 3/2018 | Perez Barrara | |
| 2018/0157993 A1 | 6/2018 | Northrup | |
| 2018/0188068 A1 | 7/2018 | Droege | |
| 2018/0189729 A1 | 7/2018 | Droege | |
| 2018/0202818 A1 | 7/2018 | Zhang | |
| 2018/0225796 A1 | 8/2018 | Liu | |
| 2018/0231984 A1 | 8/2018 | Alonso-Mora | |
| 2018/0253805 A1 | 9/2018 | Kelly | |
| 2018/0300660 A1 | 10/2018 | Coan | |
| 2018/0308038 A1 | 10/2018 | Zhou | |
| 2018/0336510 A1 | 11/2018 | DaCosta | |
| 2019/0026662 A1 | 1/2019 | Kring | |
| 2019/0035037 A1 | 1/2019 | Chase | |
| 2019/0064801 A1 | 2/2019 | Frazzoli | |
| 2019/0113361 A1 | 4/2019 | Droege | |
| 2019/0114583 A1 | 4/2019 | Ripert | |
| 2019/0130260 A1 | 5/2019 | Han | |
| 2019/0130320 A1 | 5/2019 | Friend | |
| 2019/0130354 A1* | 5/2019 | Han | G06Q 10/0832 |
| 2019/0132699 A1 | 5/2019 | Nikulkov | |
| 2019/0132702 A1 | 5/2019 | Ehsani | |
| 2019/0163710 A1 | 5/2019 | Haghighat Kashani | |
| 2019/0289427 A1 | 9/2019 | Lin | |
| 2019/0295440 A1 | 9/2019 | Hadad | |
| 2020/0033156 A1 | 1/2020 | Droege | |
| 2020/0065734 A1 | 2/2020 | Szybalski | |
| 2020/0074524 A1 | 3/2020 | Smith | |
| 2020/0090248 A1 | 3/2020 | Zeng | |
| 2020/0151660 A1 | 5/2020 | Warr | |
| 2020/0160264 A1 | 5/2020 | Silverman | |
| 2020/0265366 A1 | 8/2020 | Mo | |
| 2020/0311618 A1 | 10/2020 | Eichler | |
| 2020/0333161 A1 | 10/2020 | Droege | |
| 2020/0374650 A1 | 11/2020 | Jung | |
| 2021/0081880 A1 | 3/2021 | Bivins | |
| 2021/0224944 A1 | 7/2021 | Choski | |

FOREIGN PATENT DOCUMENTS

| | | |
|---|---|---|
| KR | 10-2014-0101501 | 8/2014 |
| KR | 10-20170054739 | 5/2017 |
| WO | WO 2001052163 | 7/2001 |

(56) References Cited

FOREIGN PATENT DOCUMENTS

| WO | 2014/030976 | 2/2014 |
|---|---|---|
| WO | WO 2017/148202 | 9/2017 |
| WO | WO 2018/209263 | 11/2018 |

OTHER PUBLICATIONS

ISR and Written Opinion in PCT/US2018/058859 dated Feb. 20, 2019.
Reutt, Alex "Deliveroo Frank About Improved Algorithm Improving Service Times by 31%", Oct. 17, 2017 (https://www.itwire.com/home-it/80398-deliveroo-frank-about-improved-algorithm-improving-service-times-by-31.html).
Written Opinion in PCT/US2018/058859 dated Oct. 21, 2019.
IPRP dated Nov. 7, 2019 in PCT/US2018/058554.
ISR and Written Opinion in PCT/US2019/051993 dated Sep. 19, 2019.
HungryBBQ Delivery Details, Sep. 11, 2019 www.hungrybbq.com/delivery_info.php.
Eatzcatering FAQ, Nov. 13, 2018 www.eatzcatering.com.
Technological Disruption and Innovation in Last-Mile Delivery, Stanford Value Chain Innovation Initiative, Stanford, Jun. 2016.
Collaborative Urban Logistics: Synchronized Last-Mile Logistics for Sustainable, Efficient Urban Delivery, TLI Asia Pacific White Paper Series, vol. 13, Nov. 2013.
Grand Junction Local Delivery Reinvented—Last Mile Platform Help, Grand Junction Inc., PerfectLastMile.com, 2016.
Computerised Vehicle Routing and Scheduling (CVRS) for Efficient Logistics, Department for Transport, 2005.
Mabe, John, The 'Uber-for-X Model' and the Complexity of On-Demand Delivery, Techgistics, Dec. 1, 2016.
Singliar, Tomas, Demand Forecasting for Shipping and Distribution, Azure AI Gallery, Jun. 26, 2017.
Chen, P., Crowdsourced Delivery for Last-Mile Distribution: An Agent-Based Modeling and Simulation Approach, IEEE, 2017.
ISR and Written Opinion in PCT/US2018/058554 dated Feb. 13, 2019.
IPRP dated Aug. 25, 2020 in PCT/US2019/051993.
U.S. Appl. No. 15/491,932, Office Action dated Sep. 18, 2019, 18 pages.
U.S. Appl. No. 15/491,932, Office Action dated Mar. 10, 2020, 22 pages.
U.S. Appl. No. 15/491,932, Advisory Action dated May 19, 2020, 3 pages.
U.S. Appl. No. 15/491,932, Office Action dated Jan. 4, 2021, 23 pages.
U.S. Appl. No. 15/491,932, Office Action dated Aug. 6, 2021, 24 pages.
U.S. Appl. No. 15/491,932, Advisory Action dated Oct. 21, 2021, 3 pages.
PCT International Preliminary Report on Patentability in Application PCT/US2016/027869, dated Oct. 26, 2017, 9 pages.
PCT International Preliminary Report on Patentability in PCT/US2018/058859, dated Jan. 20, 2020, 20 pages.
PCT International Search Report and Written Opinion issued in PCT/US2016/027869 dated Jul. 20, 2016, 10 pages.
U.S. Appl. No. 15/130,018, Advisory Action dated Aug. 18, 2020, 3 pages.
U.S. Appl. No. 15/130,018, Notice of Allowance dated Jan. 27, 2021, 9 pages.
U.S. Appl. No. 15/130,018, Office Action dated Jan. 24, 2020, 28 pages.
U.S. Appl. No. 15/130,018, Office Action dated May 4, 2020, 33 pages.
U.S. Appl. No. 15/802,385, Office Action dated Jan. 7, 2020, 33 pages.
U.S. Appl. No. 15/802,385, Office Action dated Jul. 30, 2020, 39 pages.
U.S. Appl. No. 15/802,391, Office Action dated Dec. 12, 2019, 30 pages.
U.S. Appl. No. 15/802,391, Office Action dated Mar. 26, 2020, 35 pages.
U.S. Appl. No. 15/802,394, Office Action dated Nov. 22, 2019, 26 pages.
U.S. Appl. No. 15/802,394, Office Action dated Mar. 30, 2020, 27 pages.
U.S. Appl. No. 16/192,342, Office Action dated Jun. 11, 2021, 23 pages.
U.S. Appl. No. 16/365,553, Office Action dated Nov. 18, 2020, 34 pages.
U.S. Appl. No. 16/365,553, Office Action dated Apr. 12, 2021, 32 pages.
U.S. Appl. No. 16/365,553, Office Action dated Jul. 26, 2021, 34 pages.
U.S. Appl. No. 16/111,013, Office Action dated Jul. 2, 2020, 33 pages.
U.S. Appl. No. 16/111,013, Office Action dated May 3, 2021, 24 pages.
U.S. Appl. No. 16/111,013, Office Action dated Jul. 9, 2021, 25 pages.

* cited by examiner

NETWORK COMPUTER SYSTEM TO IMPLEMENT PREDICTIVE TIME-BASED DETERMINATIONS FOR FULFILLING DELIVERY ORDERS

TECHNICAL FIELD

Examples provide for a network computer system to implement predictive time-based determinations for fulfilling delivery orders.

BACKGROUND

Numerous on-demand services exist to offer users a variety of services: transportation, shipping, food delivery, groceries, pet sitting, mobilized task force and others. Typically, on-demand services leverage resources available through mobile devices, such as wireless (e.g., cellular telephony) devices, which offer developers a platform that can access sensors and other resources available through the mobile device. Many on-demand services include dedicated applications (sometimes referred to as "apps") to communicate with a network service through which an on-demand service is offered.

DETAILED DESCRIPTION

Figure 1:
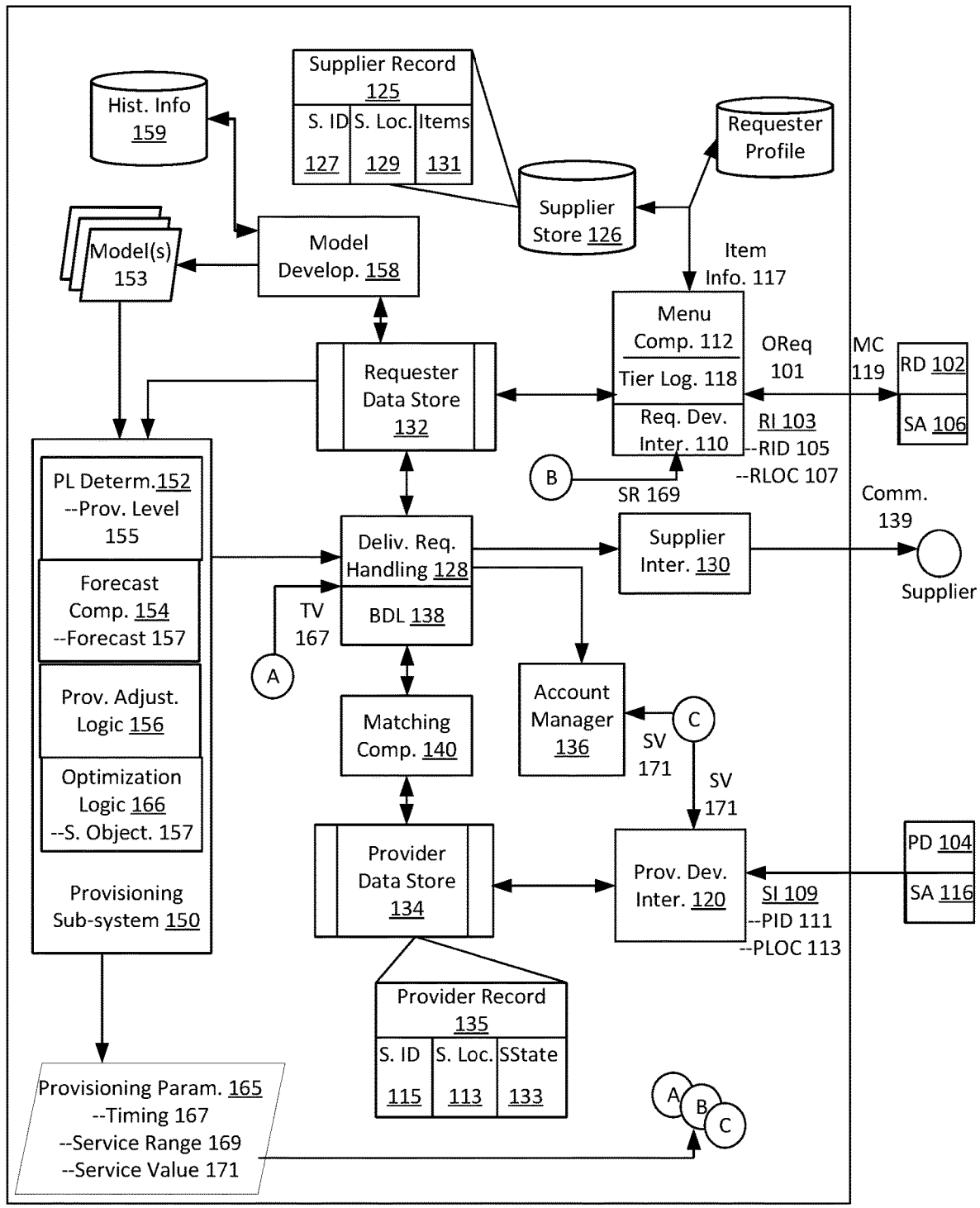
FIG. 1 illustrates an example of a network computing system for arranging transport of delivery orders, according to one or more examples.

According to some examples, a network computing system implements operations to arrange transport services for delivery orders.

In some examples, a network computing system estimates a provisioning level for a given time interval for one or more regions. The provisioning level determination may be based on an estimated number of order requests, and a number of available service providers in the given region that are available to provide transport in fulfilling the order requests. For individual requesters within the given region, the computer system selects a set of multiple suppliers for a respective supplier menu that is displayed on a mobile device of the requester. The selection of suppliers for individual requesters may be based at least in part on a current location of the requesters, and at least one of the estimated number of order requests or the estimated number of available service providers.

In variations, a network computing system arranges transport for delivery orders by (i) predicting an order preparation time of the respective supplier for the order request; (ii) during a time interval that precedes the order preparation time, generating a request for a service provider, based at least in part on a determination that an arrival time of a matched service provider to the respective supplier is within a designated threshold of the order preparation time. An order delivery time for the requester may be estimated based at least in part on the predicted order preparation time and an estimated trip time from a location of the supplier to a location of requester.

As used herein, a client device refers to devices corresponding to desktop computers, cellular devices or smartphones, wearable devices, laptop computers, tablet devices, television (IP Television), etc., that can provide network connectivity and processing resources for communicating with the system over a network. A driver device can also correspond to custom hardware, in-vehicle devices, or on-board computers, etc. The client device and/or the driver device can also operate a designated application configured to communicate with the system 100.

While some examples described herein relate to transport services, the system 100 can enable other on-demand location-based services (e.g., a food truck service, a delivery service, an entertainment service) to be arranged between individuals and service providers. For example, a user can request an on-demand service, such as a delivery service (e.g., food delivery, messenger service, food truck service, or product shipping) or an entertainment service (e.g., mariachi band, string quartet) using the system, and the system can select a service provider, such as a driver, food provider, band, etc., to provide the on-demand service for the user.

One or more embodiments described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more embodiments described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some embodiments described herein can generally require the use of computing devices, including processing and memory resources. For example, one or more embodiments described herein may be implemented, in whole or in part, on computing devices such as servers, desktop computers, cellular or smartphones, tablets, wearable electronic devices, laptop computers, printers, digital picture frames, network equipment (e.g., routers) and tablet devices. Memory, processing, and network resources may all be used in connection with the establishment, use, or performance of any embodiment described herein (including with the performance of any method or with the implementation of any system).

Furthermore, one or more embodiments described herein may be implemented through the use of instructions that are executable by one or more processors. These instructions may be carried on a computer-readable medium. Machines shown or described with figures below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, embodiments may be implemented in the form of computer-programs, or a computer usable carrier medium capable of carrying such a program.

FIG. 1 illustrates an example of a network computing system for arranging transport of delivery orders, according to one or more examples. According to examples, a network computing system 100 provides a network delivery service that can be utilized by requesters, suppliers and service providers. The network computing system 100 may be implemented on a server, on a combination of servers, and/or on a distributed set of computing devices which communicate over a network such as the Internet. Still further, some examples provide for the network computing system 100 to be distributed using one or more servers and/or mobile devices. In some variations, the network computing system 100 is implemented as part of, or in connection with a network system, where, for example, operators use service vehicles to provide transport-related services between locations. In variations, the network computing system 100 may be implemented using mobile devices of users, including service providers and requesters, with the individual devices executing a corresponding service application that causes the computing device to operate as an information inlet and/or outlet for the network computing system 100.

In some examples, the system 100 implements a network platform, in connection with applications that run on mobile devices of the population of users. For a given geographic region, the users can include (i) operators (or "service providers") of service vehicles, (ii) requesters who request and receive delivery orders transported by service providers, and (iii) suppliers, who provide requested delivery orders for transport. While some examples describe suppliers in context of food preparation (e.g., restaurant), the system 100 can be implemented to arrange delivery for other kinds of deliverable items, such as groceries, or serviced items. More generally, the system 100 may be implemented to arrange delivery of any type of item, including items which may require preparation.

With reference to an example of FIG. 1, the system 100 includes a requester device interface 110, a provider device interface 120, a request handling component 128, a supplier interface 130, a matching component 140, and one or more data stores which update information about requesters, order requests and providers. Additionally, the system 100 may include a provisioning subsystem 150, to enable system 100 to adjust a provisioning level of the system 100.

As described with some examples, the provisioning subsystem 150 enables a provisioning level of the system 100 to be estimated or otherwise ascertained with respect to an actual or expected demand from requesters in a given time period, and with respect to a given region (e.g., city or portions of city). Additionally, the provisioning sub-system 150 can be utilized to adjust the provisioning level with respect to the manner in which the system 100 provides a network service to arrange transport for delivery orders. In particular, the provisioning sub-system 150 can make adjustments to the ascertained provisioning level of the network service, in a manner that is optimized for objectives of the provided network service. In this manner, various facets of the provided network service can be adjusted with fluctuations in demand from requesters, in order to, for example, maximize a number of order requests which can effectively be handled in a given duration of time. Moreover, the optimization which can be performed through the network service may be implemented on a group level, so as to objectively accommodate the interests of service providers, suppliers, and requesters.

The requester device interface 110 includes or performs processes that run on the network-side of the system 100 to establish communication channels with individual devices of requesters. The requesters may operate mobile devices (represented in FIG. 1 by the mobile device 104) on which a corresponding service application 106 may execute. The requesters may operate respective service applications 106 to request delivery services, and in some variations, other types transport-related services, such as human transport between a start location (or pickup location) and a destination (or drop-off). When the service application 106 is launched on the requester device 102, the requester device 102 may transmit requester information 103 to the system 100. The requester information 103 may include an account identifier 105, as well as the current location of the requester device 107, which the service application 106 may obtain by interfacing with a satellite receiver or other location-aware resource of the requester device 102. As described in greater detail, the requester information 103 can also be communicated with an order request 101. In some variations, at least some of the requester information 103 (e.g., current location) may be communicated before a order request 101 is made on the requester device 102.

According to some examples, the provider device 104 initiates communications with the system 100 using the service application 116. The service application 116 may correspond to a program (e.g., a set of instructions or code) that is downloaded and stored on the mobile device 104 of the service provider. The service provider can launch the service application 116 in order to utilize the system 100 to receive order requests and/or other type of service requests (e.g., transport requests). The service provider may operate a service vehicle to fulfill assigned service requests. Once the communication channel is established by the provider device 104 using the service application 116, the provider device 104 may repeatedly or continuously communicate service information 109 to the network computing system 100. The service information 109 may include the provider's identifier 111, and the provider's current location 113, which may be determined by the service application interfacing with a satellite receiver of the provider device 104.

The provider device interface 120 includes or performs processes that run on the network-side of the system 100 to establish communication channels with individual devices of service providers. For example, the device interface 110 can establish secure sockets with different types of mobile devices, which service providers of the system 100 can utilize when providing services using their respective vehicles. In some examples, the service providers operate mobile devices (represented in FIG. 1 by the mobile device 104) on which a corresponding service application 116 may be operated. Among other functionality, the service application 116 can automate operations which include indicating the availability of the service provider to provide service, communicate location information to enable the system 100 to monitor the location of the service provider's vehicle, receive information from the system 100 to facilitate the service provider in receiving order requests and fulfilling order requests, as well as communicating information to the system 100 for various purposes, including provisioning determination.

The system 100 may include an active provider data store 134 that maintains records 135 that associate individual providers with their respective current location 113 and service status 133. By way of example, each service provider may start a shift by operating the service application 116 (e.g., opening the application on the provider's device 104), and then toggling a state feature provided by the service application 116 to 'on duty'. The service application 116 communicates the activation of the state feature to the system 100 via the provider device interface 120. The provider device interface 120 processes the service information 109 received from individual service providers. For each service provider, the provider device interface 120 extracts and stores the current location 113 of the provider device 104 with the provider's identifier 115 in the provider status store 134. As the service provider's location changes (e.g., with movement of the service provider's vehicle), subsequent communications from the provider device 104 via the provider device interface 120 can be used to update the provider status store 134. In this way, the service data store 134 may reflect the most current location of each service provider.

In some examples, the requester device interface 110 and the provider device interface 120 can each include or use an application programming interface (API), such as an externally facing API, to communicate data with the provider and requester devices 102, 104, respectively. By providing the externally facing API, the system 100 can establish secure communication channels via secure access channels over the network through any number of methods, such as web-based forms, programmatic access via RESTful APIs, Simple Object Access Protocol (SOAP), remote procedure call (RPC), scripting access, etc.

The supplier interface 130 may correspond to a programmatic interface that transmits order requests from requesters to a terminal of a supplier. The context of food delivery, the supplier interface 130 transmits delivery orders to a computer system (e.g., reservation ordering system, point-of-sale device, dedicated take-out terminal, etc.) of the supplier. In some examples, the supplier may operate a mobile device on which a service application for suppliers is provided, in order to receive order requests from the system 100. The supplier may access the system 100 via, for example, a website or application interface (e.g., supplier service application) in order to accept order requests, as well as to provide information as to the preparation status of a order request. Additionally, the supplier may access the system 100 in order to provide menus or descriptions (including text and images) of available items for delivery.

The system 100 may maintain a supplier library 126, which includes a record 125 for each supplier. Each supplier record 125 may associate a respective supplier with an account identifier 127, as well as a supplier location 129 and a set of deliverable items 131 provided by that supplier. The supplier may specify the items 131 via the supplier interface 130. The supplier items 131 may be provided as an electronic document, or combination of records provided by the supplier, which can be retrievable and rendered on a requester device 102 in the form of, for example, a menu. By way of example, the supplier items 131 may include a restaurant menu, or items for a restaurant menu.

According to some examples, when the requester launches the service application 106, the requester device 102 provides the system 100 with the current location 107 of the requester. In some variations, the requester can specify a service location for the delivery order that is different than the requester's current location 107. The requester device interface 110 may communicate the requester's current location 107 (or alternatively, the service location specified by the requester) to a menu component 112, and the menu component 112 may use the current location of the requester to retrieve item information 117, representing a selection of the supplier's deliverable items 131, from the supplier library 126. The requester device interface 110 may communicate menu content 119 to the requester device 102, via the service application 106. As described with some examples below, the menu content 119 may also communicate one or more service value parameters 171, indicating a charge or consideration which the requester will incur for receiving delivery of a requested item from the supplier. The user can browse through the menu content 119 in order to view a list of suppliers, and view items which each available supplier has available for delivery. The service application 106 may enable the user to interact with the menu on the requester device 102, in order to select items for a delivery order. Upon making a selection for delivery order, the service application 106 may cause the requester device 102 to transmit a order request 101 to the system 100.

In some examples, the requester status store 132 records instances when the service application 106 is launched on the requester device 102. In such cases, the requester status store 132 may associate a record with the requester of the requester device 102 (e.g., based on the account information provided by the requester device), and the record may reflect the state of the requester 100 to as being active. Once the order request 101 is received from the requester device 102, the requester's record may be updated and associated with the order request 101.

The order request 101 may be received by the requester device interface 110 and recorded in a requester-status store 132. In some examples, the requester device interface 110 and the menu component 112 may implement a geographic constraint for individual requesters, based on a service range parameter 169. The service range parameter 169 may define a distance (e.g., travel distance) from the service location of the desired order request, from which available suppliers may be made available to the requester for purpose of order requests. For example, the service range parameter 169 may be set to 2 miles or 12 minutes of travel time, and the menu component 112 may implement a filter to remove suppliers who are outside of a distance identified by the range parameter 169. In this way, the service application 106 running on the requester device 102 is not provided with menu content 119 reflecting deliverable items from a supplier that is outside of the range parameter 169.

As an addition or variation, the range parameter 169 may be used to establish tiers amongst suppliers, with respect to the service location of a given order request 101. The menu component 112 may, for example, implement tier logic 118 that sets alternative order request rules for suppliers based at least in part on a tier designation assigned to individual suppliers. The tier logic 118 may assign tier designations based in part on the location of the supplier as compared to the service location of the order request. Based on implementation, the tier logic 118 may designate different minimum order sizes or values for order requests of suppliers, based in part on the tier designations of the respect suppliers. As an addition or variation, the tier logic 118 may implement one or more service value parameters 171 to determine different service values for delivery from different suppliers, based on the tier designation of the respective suppliers with respect to the service location.

According to some examples, the request handling component 128 acts on the incoming order request 101, and updates the status of the order request 101 as the order request is processed. Initially, the request handling component 128 may send a communication 139 to the supplier of the order request 101, where the communication 139 identifies the items of a requester's order request 101. The communication 139 may be communicated to a selected supplier view the supplier interface 130. In some implementations, the supplier may acknowledge or confirm the communication 139. For example, the supplier may provide input through a supplier service application, by messaging or other platform to acknowledge the communication 139.

The request handling component 128 can also trigger the matching component 140 to initiate a matching process to select a service provider for the order request 101. In some examples, the request handling component 128 may time when to trigger the matching component 140, based on an expected time when the corresponding delivery order for the order request 101 is prepared. The timing of when to trigger the matching component 140 may include, for example, the request handling component 128 estimating an order preparation time. In particular, the request handling component 128 may time (e.g., delaying) the trigger for the matching component 140 based on a comparison of the preparation time and an estimated duration that includes an estimated time interval for when a service provider is matched to the delivery request and an estimated time interval for when the service provider travels to the location of the supplier to pick up the corresponding delivery order. By way of example, the matching component 140 may be triggered so that the estimated arrival time of the service provider at the location of the supplier (e.g., time to match corresponding order request 101 to service provider and time for service provider to travel to location of the supplier) is within a threshold window of time of an estimated order preparation time for the supplier and/or items of the respective order request 101.

The determination of the delivery order preparation time may be made based on, for example, information associated with the supplier. For example, the supplier store 126 may associate preparation time values with the supplier, and/or with the items that individual suppliers make available for delivery requests 101. As described with some examples, the order preparation time may be developed from models which monitor order requests from individual suppliers over a given time period.

In some examples, the request handling component 128 may determine, from the estimated order time of an item and/or supplier, that the preparation time is likely to be less than the estimated duration for matching the corresponding order request to a service provider and for the matched service provider to arrive at the location of the supplier. In such examples, the request handling component 128 may delay sending the communication 139 (for the corresponding order request 101) to the supplier specified by the respective order request 101 until after a service provider is matched to the respective order request 101. In such examples, the delay in sending the communication 139 for the respective order request 101 may be measured so that the estimated order preparation time falls within a window of time that is estimated for a matched service provider to arrive at the location of the supplier.

The matching component 140 may match the order request 101 to an available service provider based at least in part on the current location of individual providers with respect to the location of the supplier. In some variations, the matching component 140 may also match the order request 101 based on a desired arrival time for the provider at the location of the supplier. Thus, for example, the proximity of the service provider may not necessarily be a decisive selection criterion for selecting a given service provider.

In some examples, the request handling component 128 may select and implement batch decision logic 138, in order to implement rules and parameters for determining when delivery orders can be batched. Batching may refer to instances when a service provider handles two delivery orders. The batch decision logic 138 may implement batching in accordance with one or multiple set of rules and/or parameters from which a decision can programmatically be made. The batch decision logic 138 may vary, so that different rules, parameters, and/or parametric values may be utilized to determine when batching can be performed. In particular, the batch decision logic 138 may implement alternative rules that determine (i) whether or not batching is permitted under any circumstances; and (ii) if batching is permitted, conditions under which multiple delivery orders may be batched. By way of example, the conditions which may determine or influence batching decisions may include (i) a same supplier condition, in which batching of delivery orders is permitted when the delivery orders are prepared by a same supplier; (ii) a timing condition, which may set a window of time with respect to when order requests are prepared and/or delivered with respect to one another before batching is permitted; (iii) a supplier location condition, in which batching of delivery orders is permitted when the delivery orders are prepared by suppliers that satisfy a geographic condition with respect to each supplier's location and/or delivery location; and/or (iv) provisioning conditions, where a provisioning level determination 155 determines or influences batching decisions.

With respect to provisioning conditions, some examples provide that batching may be maximized with respect to permissibility when, for example, an inadequate number of service providers are present to handle order requests. Conversely, batching may be minimized when there is oversupply of service providers, as separate service providers can be used to deliver orders which could otherwise be batched.

Figure 5:
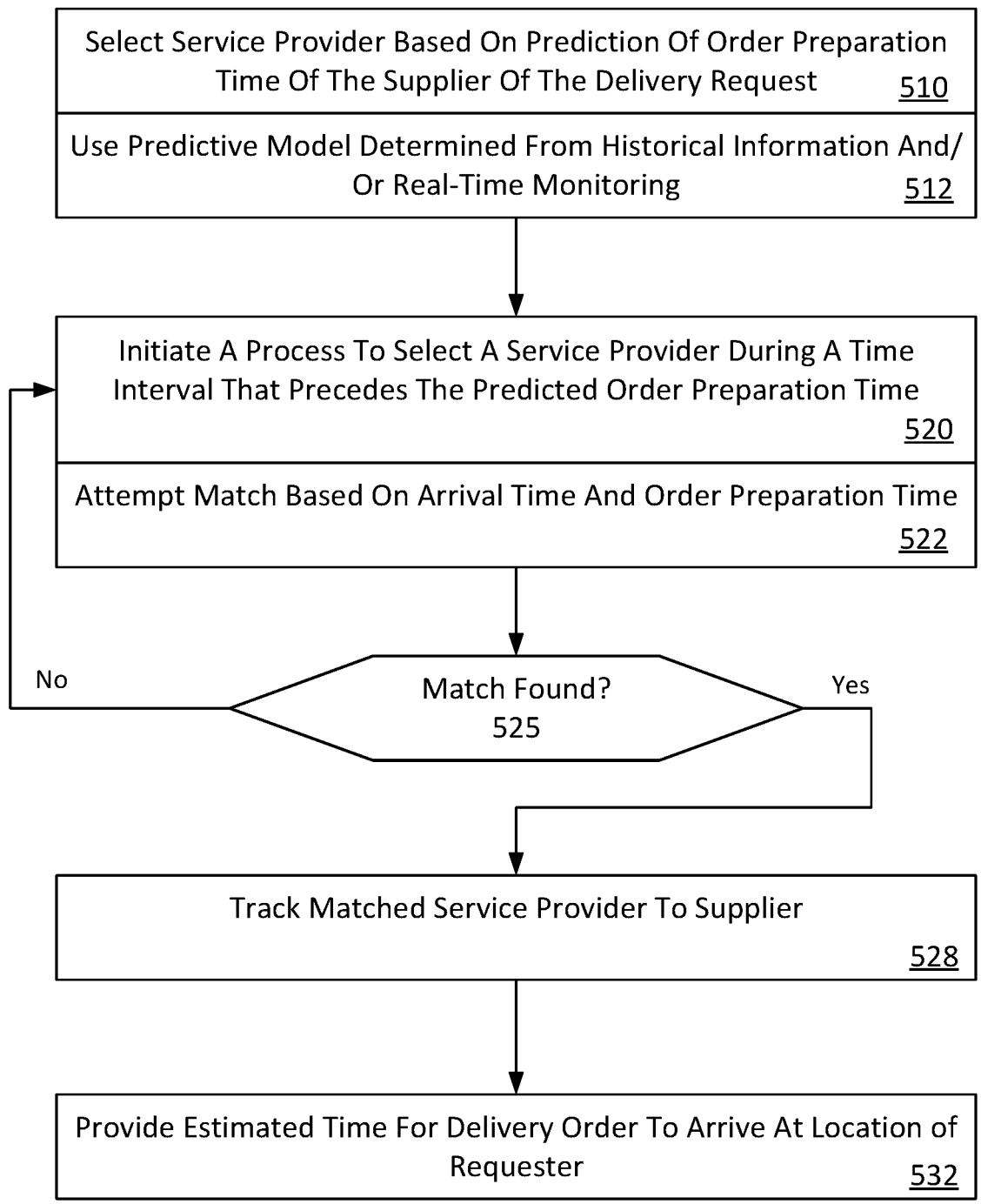
FIG. 5 illustrates another example method for arranging transport for delivery orders to minimize service provider wait time.

With respect to timing conditions, some examples provide for the batch decision logic 138 to utilize timing parameters 167, as determined by the provisioning subsystem 150, in order to determine when batching of delivery orders is permitted. For example, the request handling component 128 may utilize one or more timing parameters 167 to minimize a wait time incurred by the service provider while at the supplier. For example, in the context of food preparation, if the arrival time of the service provider exceeds the time when the food is prepared, the prepared food may become cold or less desirable. At the same time, if the arrival time of the service provider is before when the prepared food is ready, the service provider is waiting, and thus underutilized. The request handling component 128 may include logic to initiate the matching process in a window of time that precedes an expected preparation time for the requested delivery order, so that an assigned service provider will arrive at the supplier location just when the requested delivery order is prepared and ready for pickup. FIG. 5 illustrates an example method which can be implemented by, for example, the request handling component 128 to control the selection of a service provider based at least in part on a determination of an optimized arrival time.

In variations, the batch decision logic 138 may permit delivery orders to be batched if they are from the same supplier, and deliverable by a given service provider to multiple recipients at different locations within a predetermined time limit. The predetermined time limit may be set to, for example, order preparation time (or order pickup time) and/or order delivery time. For example, one or more timing parameters 167 may set a limit of when the last batched order can be picked up and/or delivered with respect to the delivery order's preparation time and/or order request time (e.g., when the respective order request 101 was made). As an addition or alternative, the timing parameter 167 may set a comparable window of time as between the pickup time or delivery time of each delivery order that is to be batched. In variations, other timing parameter(s) 167 may control when delivery orders can be batched from a given supplier.

With respect to supplier location conditions, the batch decision logic 138 may implement alternative rules, which enable, for example, a service provider to handle delivery orders from different suppliers, subject to additional criteria being satisfied. As an alternative to a same supplier condition, for example, the batch decision logic 138 may permit delivery orders from different providers to be batched, provided that, for example, the different suppliers satisfy a proximity condition with regard to their respective locations (e.g., suppliers are in same building, next to each other, on same block, within walking distance, etc.). As another example, the batch decision logic 138 may permit delivery orders from different providers to be batched, provided that, for example, the different suppliers satisfy a routing condition, such as the different suppliers being aligned along a route for purpose of delivery.

Once the matching component 140 selects a provider for the order request 101, the request handling component 128 can monitor the provider via updates to the provider location (e.g., as maintained in the provider status store 134). In particular, the request handling component 128 can track the provider to the location of the supplier, and from the location of the supplier to the service location of the order request 101. The status of the requester's order request may be repeatedly updated by the request handling component 128 in the requester status store 132, to reflect events such as (i) the order request 101 being communicated to the supplier; (ii) the supplier acknowledging the order request; (iii) one or more progress indicators for the order request being prepared, including when a corresponding delivery order is ready; (iv) a service provider picking up the corresponding delivery order; (v) progress of the service provider to the service location identified in a order request; and/or (vi) arrival of the service provider at the service location of the requester (e.g., the requester's current location, or specified location).

Additionally, in examples, predictive information that may be useful to the requester may be determined and communicated to the requester device 102. For example, the estimated delivery time may be predicted initially before the requester makes the order request 101. As the order request 101 is processed by the supplier, the delivery time may be updated for the requester. Likewise, the delivery time may be updated as the matching component 140 identifies a service provider and as the request handling component 128 tracks the service provider from pickup to the location of the delivery order.

Similarly, the matching component 140 (and/or the request handling component 128) may change the associated state of the service provider, to reflect, for example, one or more unavailable states. For example, the states of the service provider may include available, assigned to order request, on route to supplier, at supplier, on route to requester, and completing order request.

Once the service provider is detected to have completed the delivery service, the request handling component 128 may trigger an account manager 136. The account manager 136 may record the fulfillment of the order request with respect to the accounts of the service provider, supplier, and requester. In some examples, a charge or other consideration is withdrawn from an account of the requester for the acquired delivery. Likewise, the account manager 136 may credit an account of the supplier for providing the delivery order. The account of the service provider may also be credited based at least partially on the service value parameter 171 associated with the fulfilled order request 101.

According to some examples, the provisioning sub-system 150 includes a provisioning level determination ("PLD") component 152, a forecasting component 154 and a provisioning level adjustment ("PLA") component 156. The PLD component 152 can estimate a provisioning level for a given region, either during a current time interval or for a future time interval, based on forecasted information from the forecasting component 154. The provisioning level 155 can reflect a determination, for a given interval of time, of the adequacy of the number of service providers for the number of service requests that are to be handled. The forecasting component 154 may generate a forecast for one or more facets of the provisioning level determination. For example, the forecasting component 154 can predict the number of service requests that are to be received by the system 100 over an immediate time interval, or for a time interval in the future. The forecasting component 154 may also forecast, or otherwise estimate a number of service providers that are (or will be) available in a given region to fulfill order requests 101. The PLA component 156 can implement logic to adjust the provisioning level 155 of the system 100, in a manner that optimizes for one or more service objectives of the system 100.

The provisioning sub-system 150 may utilize a variety of models 153, including predictive models 153A and/or optimization models 153B. By way of example, the predictive models 153A can include tree-based models, deep learning models, neural network models, and/or regression models. By way of example, the predictive models 153A may be generated and trained to predict provisioning level determinations (e.g., number of order requests, conversion rate from requesters who have service application running without placing order, etc.) and timing predictions (e.g., order preparation time). The optimization models 153B may include, for example, respective convex and non-convex models, and combine tutorial optimization models.

In some examples, a model development component 158 develops respective models 153A, 153B using machine learning processes, by which, for example, the models are trained and tuned over time, using real-time information (e.g., from requester data store 132 and/or provider data store 134) and historical information 159.

In some examples, the model development component 158 may develop one or more models 153 for use by the provisioning subsystem 150. The provisioning models 153 may include a conversion model that enables the forecasting component 154 to use real-time information to generate a forecast 157 for the number of order requests. The conversion model may, for example, utilize as input real-time information, obtained from the requester status store 132, corresponding to the number of active requesters who have not yet made a order request. In variations, the model development component 158 may analyze historical information 159 (e.g., prior snapshots of the requester status store 132 during prior time periods) to detect (i) an active requester session event, coinciding with a requester initiating a session with the system 100 by launching the service application 106 on their respective device 102; and (ii) a conversion event, coinciding with an active requester making a order request. Other information which may be determined from analysis of historical data may include, for example, a length of time for a conversion event to take place for individual requesters, and the suppliers which an active requester viewed. Additionally, the model development component 158 may record the occurrences of events (e.g., active requester session event, conversion event) over a continuous interval of time. For example, the model development component 158 may utilize input parameters which reflect a velocity value (or acceleration value or other derivative thereof) with request to a number of order requests, a number of active requesters, and/or a number of converted requesters.

As an addition or alternative, the model development component 158 may also develop predictive models for use in forecasting delivery requests for future intervals, when pertinent real-time information does not yet exist. The model development component 158 may develop such predictive models 153 using historical information, such as through statistical analysis, to predict a number of active requesters that may come online in a given time interval, a conversion rate of active requesters, and/or a number of order requests which may be generated from the population of users.

In determining conversion or other predictive models, the model development component 158 may also account for contextual information. For example, the model development component 158 may associate the historical information with day of week, time of day, month of year, events (e.g., sporting events), weather and other related information.

The forecasting component 154 may utilize the models 153 generated by the model development component 158 to make one or more forecasts 157 as to demand in a current time interval and/or one or more future time intervals (e.g., number of order requests which may be received in a given duration of time). According to an example, the forecasting component 154 obtains real-time information from the requester status store 132 in order to forecast a number of order requests which may be received in a current (e.g., over the next hour) or near future interval (over the next four hours). The real-time information may include, for example, a number of active requesters who have yet to make an order request, the amount of time each active requester has spent viewing the menu content 119 for individual suppliers, and/or the suppliers (e.g., respective menu of suppliers) which were viewed by the respective requesters. Based on the real-time information, the forecasting component 154 may utilize, for example, a conversion model to predict a number of order requests which the system 100 will receive in a current or immediate time interval, as well as for upcoming time intervals (e.g., number of service requests which may be received in the next four 1-hour time slots). As an addition or variation, the forecasting component 154 may also utilize the models 153 generated by the model development component 158 to estimate the number of order requests that the system 100 is expected to receive in future time intervals. For example, the model development component 158 may generate a schedule that identifies an expected number of order requests for time slots of an upcoming future time interval (e.g., hourly order request projections for each day of an upcoming week).

According to some examples, the model development component 158 may also monitor the requester status store 132 in order to compare a forecast 157 of the forecasting component 154 with respect to the number of order requests received (or the number of active requesters, etc.) with the actual outcome. Based on the comparison, the model development component 158 may tune the models 153 deployed by the forecasting component 154.

In some variations, the model development component 158 may develop and implement predictive models regarding timing-related characteristics of individual suppliers. The model determination component 158 may monitor the requester status store 132 to determine statistical samples of one or more timing-related characteristics of individual suppliers. By way of example, a timing-related characteristic of a supplier may correspond to preparation time for the supplier to prepare a delivery order. As another example, the timing-related characteristics can identify the amount of time that a service provider typically expends upon arriving at the location of the supplier and departing with the delivery order. In this way, the model determination component 158 obtains data points for the length of in which a supplier (e.g., restaurant) takes to prepare a food item for a delivery order. The timing related characteristics may be associated with the supplier and the corresponding supplier record 125.

The PLD component 152 may estimate the provisioning level 155 for current and future intervals of time based on forecasts 157, as well as service provider availability projections. In some examples, the provisioning level 155 corresponds to a metric (e.g., a ratio) that is based on a comparison of (i) an estimated number of order requests received in a given time period for a given region, and (ii) a number of service providers in the given region that are likely to be available to provide delivery service for the order requests. The estimated number of service providers may be determined from, for example, real-time information (e.g., as determined from the provider status store 132), as well as from historical information (e.g., snapshots of the provider status store 132 in prior time intervals).

The PLA component 156 may implement a set of provisioning parameters 165 based on the provisioning level 155. The provisioning parameters 165 may define respective parametric values for use with rules, process or other logic of a network delivery service. Additionally, the provisioning parameters 165, when changed, affect a provisioning level of the network service in accordance with a generally known relationship. According to some examples, a change in a provisioning parameter may increase or decrease a number of service requests (e.g., order requests) that the network computing system 100 may handle, based on a known or expected relationship with respect to the change in the provisioning parameter. The provisioning parameters 165 may have a default value when, for example, the provisioning level 155 is neutral (e.g., expected number of order requests to match available service providers), or otherwise at a desired value. When the provisioning level fluctuates away from a neutral or desirable level, the PLA component 156 may adjust the value of the provisioning parameters 165 in order to adjust the provisioning level 155.

The provisioning parameters 165 may affect various facets of the delivery service implemented by system 100. Thus, for example the PLA component 156 may utilize multiple sets of provisioning parameters based on the sub-region or region considered. According to examples, the provisioning parameters 165 reflect a facet or aspect of the service provided by the system 100 which can be adjusted to cause a predicted change to the provisioning level 155 of the service provided. In particular, the values for the individual provisioning parameters 165 may be based on an optimization determination for one or more objectives of the system 100. The optimization determination may be made through implementation of one or more optimization processes (shown as optimization logic 166) which optimize aspects of the provisioning level for a particular service objective 161. The system 100 may implement one or multiple service objectives 161, such as maximizing a number of order requests which are handled in a given duration of time, or minimizing a delivery time for order requests which are received. The values of the provisioning parameters 165 may thus be determined by the particular objective, or set of objectives, of the selected optimization process.

According to some examples, a relationship between the individual provisioning parameters 165 and the provisioning level 155 may also be predetermined or otherwise known. For example, an adjustment in the value of a given one of the provisioning parameters 165 may be known to have a likely impact in increasing the number of service requests which are handled by the system 100, while at the same time negatively impacting another objective of reducing the service time for order requests. The model development component 158 may, for example, establish relationships between the values of the individual provisioning parameters 165 and the impact of the provisioning parameter value on the provisioning level 155 for a given region or time interval. The relationships may be granular (e.g., a change to provisioning parameter will increase the number of service requests which can be handled through the system 100) or more precise (e.g., a change to provisioning parameter will have a percentage impact (e.g., 5%) on the conversion rate).

By way of example, the provisioning parameters 165 include one or more timing parameters 167, a service range parameter 169, and a service value parameter 171. The one or more timing parameters 167 may reflect a target time interval or a time-limited constraint (e.g., maximum acceptable time interval) by which a particular event in the fulfillment of a order request is to take place. For example, the timing parameter 167 may reflect either a target time or time-limited constraint, for one or more of (i) the delivery time (e.g., from the time that the order request 101 is made until when the order is delivered to the requester); (ii) a wait time incurred by the service provider, such as measured by an interval between when the service provider arrives and departs from the location of the supplier; (iii) a time interval from when a delivery order is prepared until it is picked up; and/or (iv) a time interval from when a delivery order is prepared until it is delivered. According to some examples, when one or more timing parameters 167 are relaxed, the request handling component 128 is able to batch a greater number of order requests, as the amount of time by which order requests can be matched to one another is increased.

The service range parameter 169 may reflect a range, such as a travel or absolute distance, between the location of the supplier and the service location of an order request. In some examples, the service range parameter 169 may be expressed as a travel distance, reflecting a time and/or distance of travel from the location of the supplier to the service location of the order request. The service range parameter 169 may be used by, for example, the menu component 112 to identify which suppliers of the supplier store 126 can be used for the menu items 131. The menu component 112 may query the supplier store 126 for suppliers who have locations 129 that satisfy a proximity condition with respect to the current location 107 of the requester, where the proximity condition is based on the service range parameter 169. By increasing the value of the service range parameter 169, the menu component 112 may select a greater number of suppliers from which items 131 may be used to generate the menu content 119 on the requester device 102. Conversely, by decreasing the value of the service range parameter 169, the menu component 112 may select a fewer number of supplies from which items 131 can be used to generate menu content 119 for the requester device 102. The increase or decrease with respect to the number of suppliers which are provided to individual requesters can affect the number of order requests 101 which the system receives, as requesters are more likely to generate order requests 101 when a greater number of options are available. For example, by increasing the service range parameter 169, the provisioning sub-system 150 may forecast an increase in the conversion rate, such that a greater number of order requests 101 are received over a given time period. The forecasted number of order requests 101 may be used to engage existing service providers and generally generate a greater number of service requests for service provider. The optimization logic 166 may balance the value of the service range 169 in view of constraints such as added cost to service providers, in order to meet a service level objective (e.g., greater number of order requests fulfilled through the system 100).

The service value parameter 171 may reflect a service value that is charged to the requester as part of the delivery order. As described with various examples, the service value parameter 171 may fluctuate to accommodate factors such as distance a service provider travels to fulfill the service order, tier designations for suppliers and/or availability of service providers. In some examples, the service value parameter 171 may be used to adjust the number of available service providers during a given time interval. For example, the service value parameter 171 may also be utilized by the account manager 136, which can adjust a credit or value to the service provider based on changes to the service value parameter 171. For example, if more service providers are needed to facilitate handling of an unexpected number of order requests for a given area, the service value parameter 171 may be raised, reflecting greater value and reward for service providers to assist with order requests in the given region. As shown by an example of FIG. 1, the service value parameter 171 may be communicated to the provider device interface 120, where the service value may be published to nearby providers. The provider device interface 120 may also publish the increase in the service value parameter 171 to draw in more service providers. In this way, the change in the service value parameter 171 may increase or decrease the number of service providers who operate in a given region.

Figure 2:
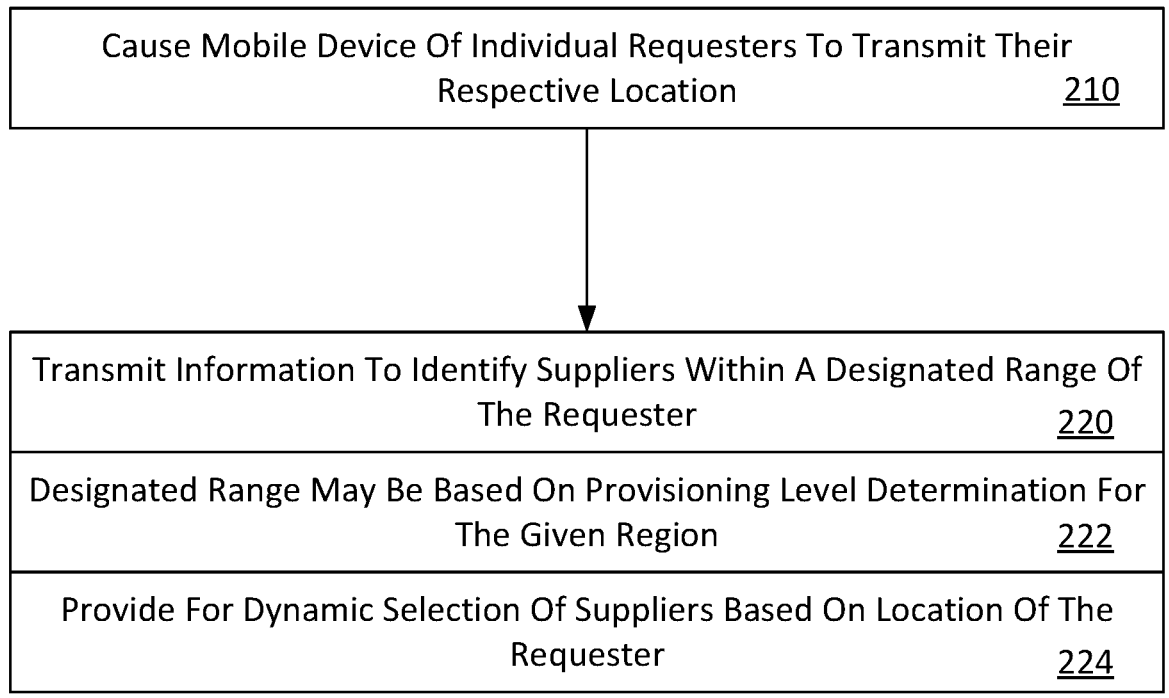
FIG. 2 illustrates an example method for identifying suppliers for delivery service to individual requesters.
Figure 3:
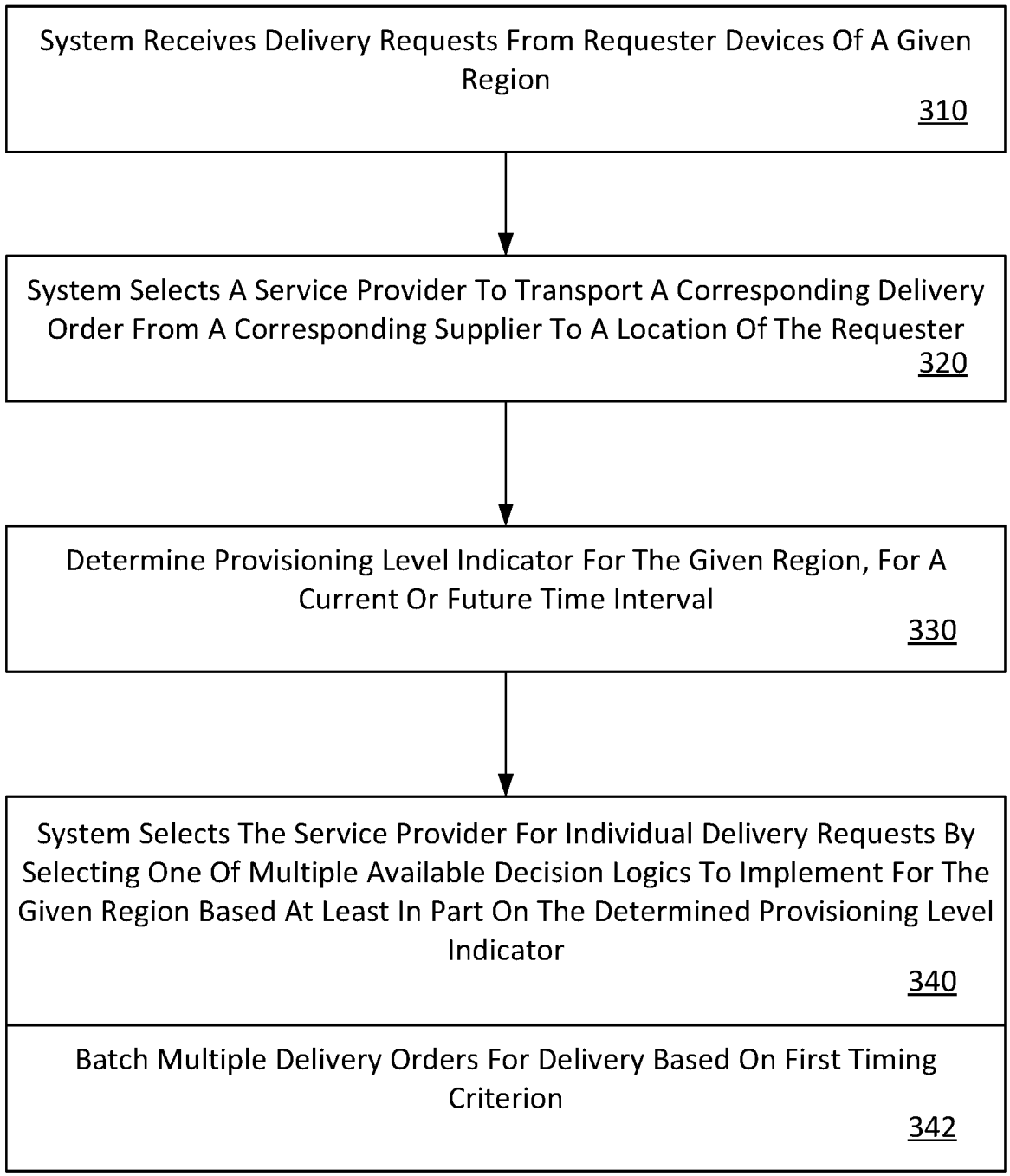
FIG. 3 illustrates an example method for arranging transport for multiple delivery orders.
Figure 4:
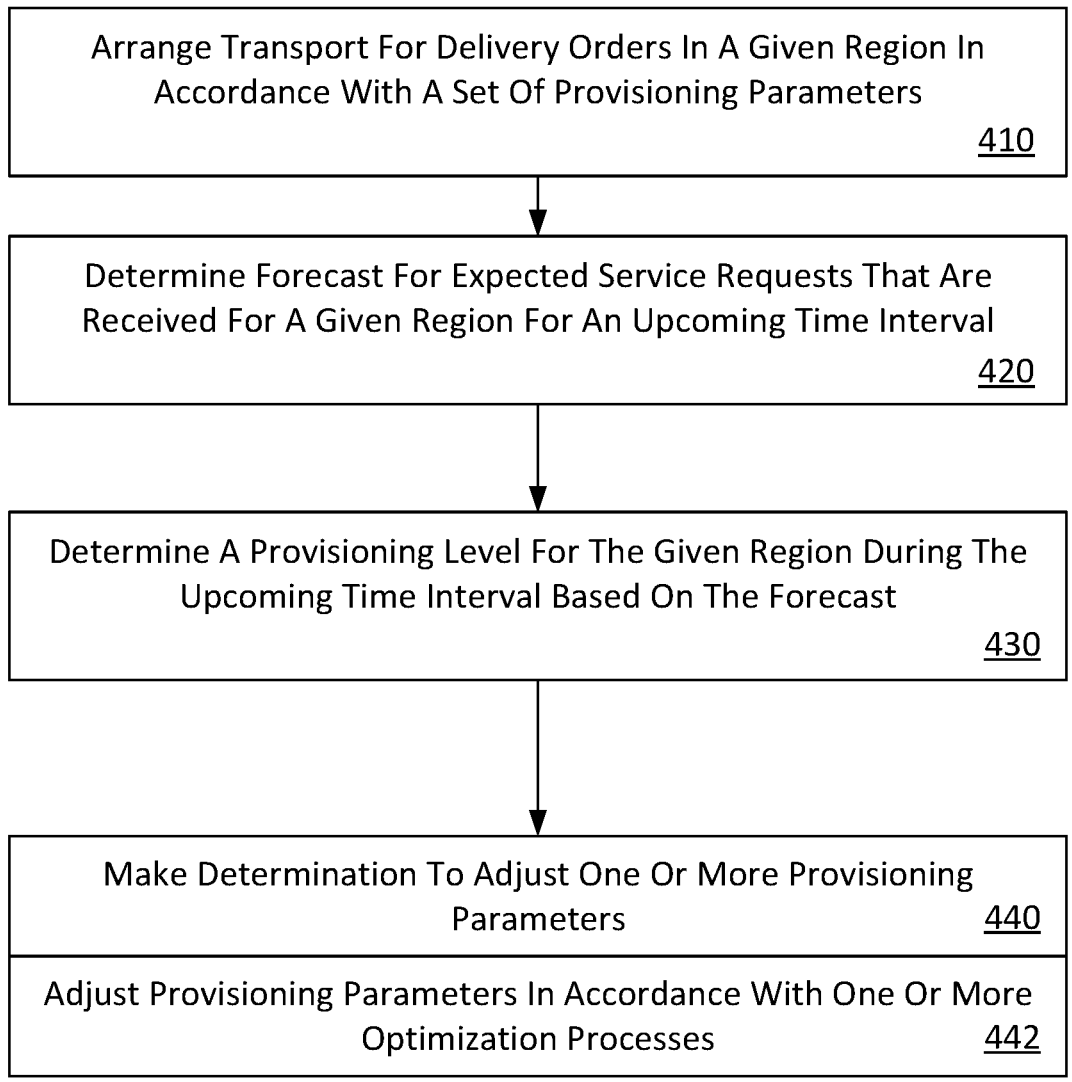
FIG. 4 illustrates an example method for arranging transport for delivery orders in a manner that affects a provisioning level of the provided service.

FIG. 2 illustrates an example method for identifying suppliers for delivery service to individual requesters. FIG. 3 illustrates an example method for arranging transport for multiple delivery orders. FIG. 4 illustrates an example method for arranging transport for delivery orders in a manner that affects a provisioning level of the provided service. FIG. 5 illustrates another example method for arranging transport for delivery orders to minimize service provider wait time. In describing examples of FIG. 2 through FIG. 5, reference is made to elements of an example of FIG. 1 for purpose of illustrating a suitable component for performing a step or sub-step being described.

With reference to an example of FIG. 2, a network computing system causes the mobile device of individual requesters to transmit their respective location (210). For example, the requester devices 102 may execute service applications 106 which access a satellite receiver or other location-aware resource of the mobile device. A requester may open the service application 106 on their respective mobile device 102 to initiate a session with the network computing system 200.

When the session is initiated, the network computing system 200 transmits information (e.g., menu content 119) to identify suppliers (e.g., restaurants) within a designated range of the requester (220). The suppliers may be identified by providing a supplier menu to the requester device. The requester may browse menus from multiple suppliers that are within the designated service range with respect to the current location of the requester. The designated range may reflect a threshold distance of travel between the location of the supplier and the current location of the requester. In some examples, the designated range may be based at least in part on a provisioning level determination for the given region (222) (e.g., a comparison of the estimated number of order requests and the number of available service providers). For example, as described with an example of FIG. 1, the designated range may be determined by the service parameter 169, which the provisioning sub-system 150 may determine based on the determined provisioning level 155 and the implementation of optimization processes by the optimization logic 166. Thus, the system 100 may change the designated service range so that a greater or lesser number of suppliers are available to a given requester. With increase in range, system 100 may also adjust other parameters, such as the service value 171 (e.g., provide additional incentive for service providers to drive extra distance), based on a known or predicted relationship between the change in the value of the respective service parameters and the provisioning level 155.

As an addition or variation, in some examples, the selection of suppliers for a given requester may be dynamic and based on the current location of the requester (224). For example, the system 100 may monitor the location of the mobile devices of individual requesters, and reselect the suppliers that are displayed on the respective mobile devices based on an updated location of the requester.

An example of FIG. 2 may reflect when the requester device 102 is placed in a pre-requests state, such as when the requester opens the service application 106 to browse available menus. The provisioning sub-system 150 may utilize the pre-request state of the requester in determining the provisioning level 155 for a sub-region where the requester is located. The provisioning sub-system 150 may also generate a forecast based on, for example, a prediction as to whether the requester will generate an order request 101. For example, the prediction of whether the user will generate the order request 101 may be based in part on a predicted or observed conversion rate as to the number of requesters who view menu content 119 from suppliers of the region and those who generate a respective order request using the menu content 119.

With reference to an example of FIG. 3, the system 100 may implement a service to arrange transport for order requests. In providing the service, the system 100 may receive order requests from requester devices of a given region, with each order request specifying a respective supplier (310). For each of the order requests, the system 100 selects a service provider to transport a corresponding delivery order from a corresponding supplier to a location of the requester (320). Additionally, in providing the service, the network computing system determines a provisioning level indicator for the given region, for a current or future time interval (330). The provisioning level indicator may be determined at least in part by requester devices 102, which communicate with the system 100 using the respective service application 106.

The system 100 selects the service provider for individual order requests by selecting one of multiple available decision logics to implement for the given region in the given time interval, where the selection of the decision logic is based at least in part on the determined provisioning level indicator (340). The system 100 may implement the selected decision logic to determine whether individual delivery orders, generated in response to respective order requests, can be batched for delivery to respective requesters. When delivery orders are batched, the same service provider may transport the respective delivery orders to their respective destinations.

According to some examples, the system 100 may implement a first decision logic to batch multiple delivery orders for delivery to respective requesters based on the multiple delivery orders satisfying at least a first timing criterion (342). As described with various examples, the timing criterion may be parameterized (e.g., timing parameter 167) and subject to change, based on conditions such as provided by provisioning level markers and determinations. By way of example, the system 100 may relax the timing parameter 167 in order to provide additional time for matched delivery orders to take place.

In various examples, the timing criterion may be based on, for example, the delivery time (e.g., change in delivery time for each of multiple delivery orders that are batched together). In other examples, the timing criterion may correspond to a wait time incurred by the service provider, such as measured by an interval between when the service provider arrives and departs from the location of the supplier. As an addition or variation, the timing parameter may correspond to a time interval from when a delivery order is prepared until it is picked up. Still further, the timing criterion may correspond to a time interval from when a delivery order is prepared until it is delivered. According to some examples, when one or more timing parameters 167 are relaxed, the request handling component 128 is able to batch a greater number of order requests, as the amount of time by which order requests can be matched to one another is increased.

With reference to an example of FIG. 4, the system 100 arranges transport for delivery orders in a given region, in accordance with a set of provisioning parameters (410). In arranging transport for delivery orders, the system 100 receives order requests from corresponding requester devices, with each order request specifying a respective supplier. Additionally, the system 100 matches each received order request to a respective service provider, in order to transport a corresponding delivery order from a respective supplier to a location of the respective requester of the service request. The set of provisioning parameters may include a service value parameter, and at least one of a service batching parameter or a service range parameter.

The network computing system may determine a forecast for expected service requests that are received for a given region, during a current or immediate time interval (420). In some examples, the forecast may be determined from a model that utilizes real-time information. For example, the model determination component 158 accesses the requester data store 132 to determine the number of active requesters who initiated a session with the system 100, but who have not yet made a delivery order.

The system 100 determines the provisioning level 155 for the given region during the upcoming time interval, based at least in part on the forecast (430). Based on the forecast, the system 100 makes a determination as to whether any of the provisioning parameters 165 in the set should be adjusted to change the provisioning level to a desired target (440). Thus, the system 100 may change the value of the provisioning parameters 165 in order to adjust the determined or forecasted provisioning level 155. For example, the service value 171 may be changed to, for example, increase the number of service providers. Likewise, the service range 169 may be increased or decreased to increase or decrease demand (e.g., conversion rate increases with more choices for requesters).

In some examples, the provisioning parameters are adjusted in accordance with one or more optimization processes which are based on service level objectives (442). The service level objectives may correspond to, for example, maximizing a number of service requests which are processed over a given time period, minimizing a travel distance of service providers, and/or minimizing a wait time of requesters for delivery orders.

In an example of FIG. 5, the system 100 receives order requests from requesters of a given region, and the system selects individual service providers for each order request. The system 100 selects the service provider by predicting an order preparation time of the supplier of the order request (510). In order to predict the order preparation time, the system 100 may develop a predictive model using historical information and/or real-time monitoring (512). For example, the model development component 158 of the system 100 may develop a predictive model based on information determined from the requester status store 132. In some examples, the model development component 158 may monitor the requester status store 132 and/or the provider status store 134 in order to determine instances when a service provider arrived at the location of the supplier early, before the delivery order was prepared. The determination may be made by identifying instances when the service provider had to wait before leaving. The presumption that can be made from the service provider waiting may be that the delivery order was not yet prepared at the time when the provider arrives at the location of the supplier. In such cases, the departure time of the service provider may be used to estimate the preparation time for the delivery order. In some examples, the arrival and departure times may be determined automatically, based on, for example, the current location of the provider device 104.

The system 100 may attempt to select a service provider during a time interval that precedes the predicted order preparation time (520). The matching component 140 may, for example, be triggered by the request handling component 128 to generate a request to identify a service provider who can be assigned to travel to the location of the supplier and arrive at a time that is within a window of margin with respect to the predicted order preparation time (522). In some examples, a determination is made as to whether the order request can be immediately matched to a service provider (525). If the order request is matched to the service provider, then the service provider may be tracked to arrive at the supplier within the window of margin (528). Additionally, the requester may receive an estimated time for the delivery order to arrive at the requester's location based on the arrival time of the service provider at the location of the supplier (532). The system 100 may continue to monitor and update the requester through the stags of the delivery order.

If the matching component 140 fails to immediately find a matched service provider for the order request, then the process may be repeated at (520). The service handling component 128 may trigger the matching component 140 again, at a different time interval, to find a match for the order request. The process may be repeated over the time interval preceding the predicted order preparation time. As the window to match the order request to the service provider gets smaller, the region(s) which the matching component 140 attempts to match becomes closer to the location of the supplier.

Figure 6:
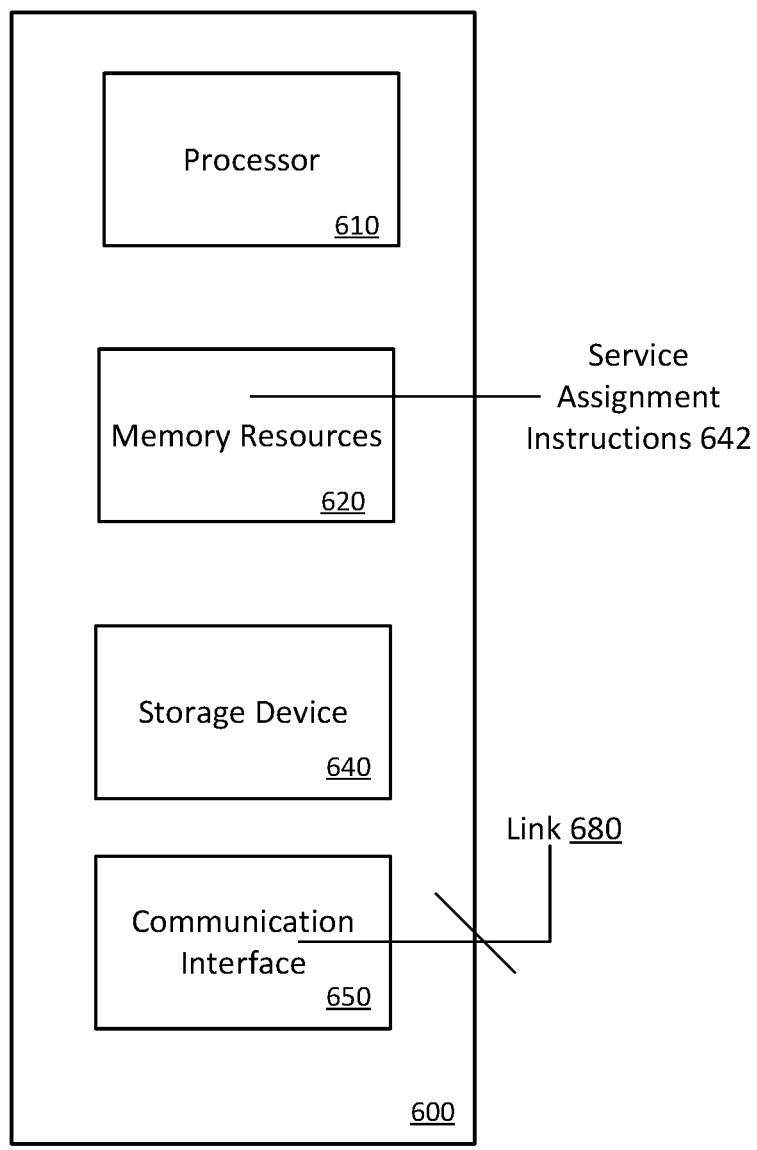
FIG. 6 illustrates a computer system on which one or more embodiments can be implemented.

FIG. 6 illustrates a computer system on which one or more embodiments can be implemented. A computer system 600 can be implemented on, for example, a server or combination of servers. For example, the computer system 600 may be implemented as part of the of an example of FIG. 1. Likewise, the computer system 600 can implement a method such as described with examples of FIG. 2 through FIG. 5.

In one implementation, the computer system 600 includes processing resources 610, memory resources 620 (e.g., read-only memory (ROM) or random-access memory (RAM)), a storage device 640, and a communication interface 650. The computer system 600 includes at least one processor 610 for processing information stored in the main memory 620, such as provided by a random-access memory (RAM) or other dynamic storage device, for storing information and instructions which are executable by the processor 610. The main memory 620 also may be used for storing temporary variables or other intermediate information during execution of instructions to be executed by the processor 610. The computer system 600 may also include the memory resources 620 or other static storage device for storing static information and instructions for the processor 610. The storage device 640, such as a magnetic disk or optical disk, is provided for storing information and instructions.

The communication interface 650 enables the computer system 600 to communicate with one or more networks (e.g., cellular network) through use of the network link 680 (wireless or a wire). Using the network link 680, the computer system 600 can communicate with one or more computing devices, specialized devices and modules, and one or more servers. The executable instructions stored in the memory 630 can include instructions 642, to implement a network computing system such as described with an example of FIG. 1. The executable instructions stored in the memory 620 may also implement a method, such as described with one or more examples of FIG. 2 through FIG. 5.

As such, examples described herein are related to the use of the computer system 600 for implementing the techniques described herein. According to an aspect, techniques are performed by the computer system 600 in response to the processor 610 executing one or more sequences of one or more instructions contained in the memory 620. Such instructions may be read into the memory 620 from another machine-readable medium, such as the storage device 640. Execution of the sequences of instructions contained in the memory 620 causes the processor 610 to perform the process steps described herein. In alternative implementations, hard-wired circuitry may be used in place of or in combination with software instructions to implement examples described herein. Thus, the examples described are not limited to any specific combination of hardware circuitry and software.

Figure 7:
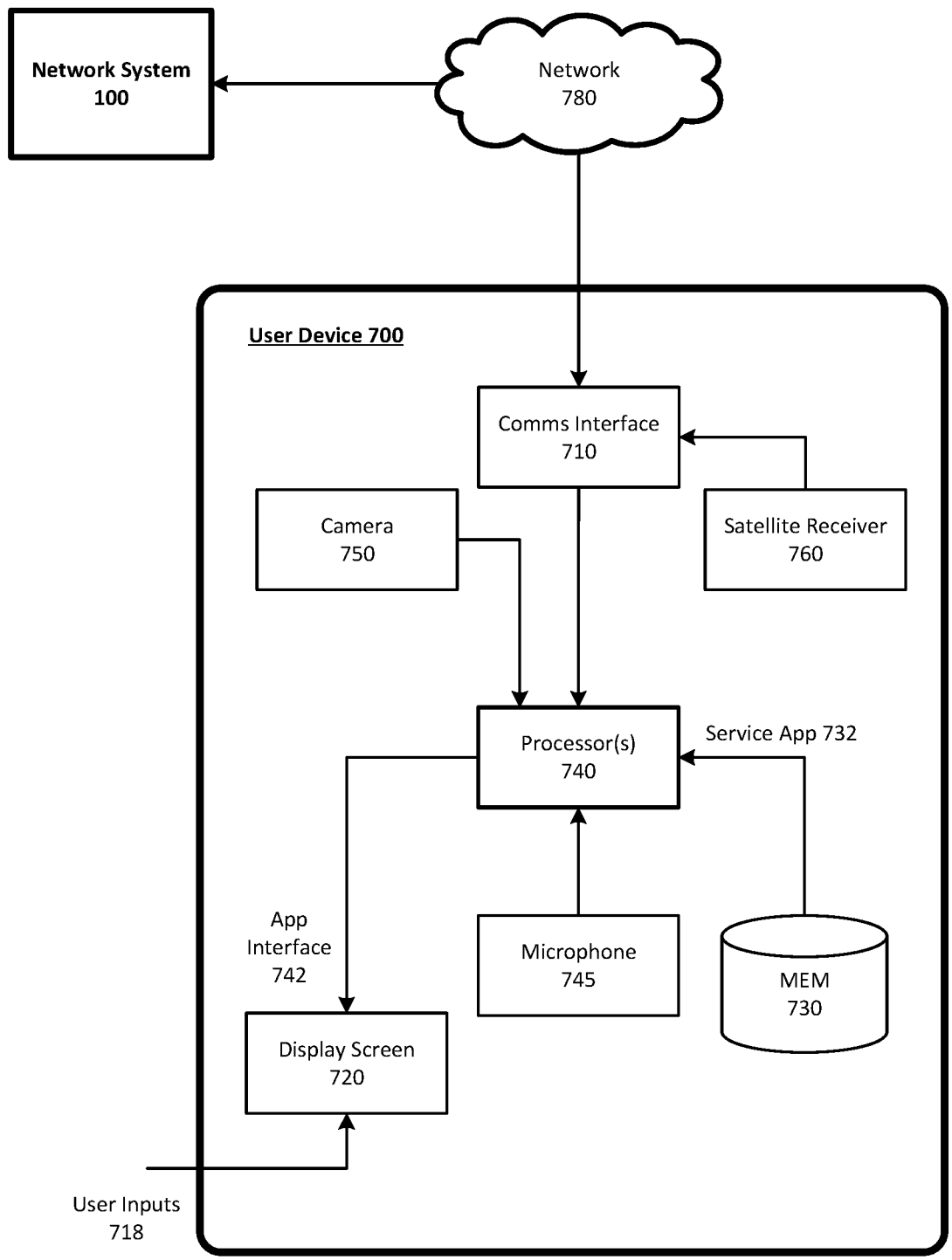
FIG. 7 is a block diagram illustrating an example user device for use with examples as described.

FIG. 7 is a block diagram illustrating an example user device for use with examples as described. In an example, a user device 700 may execute a designated service application for a network service implemented through a network computing system 100 such as described with an example of FIG. 1. In many implementations, a user device 700 can include a mobile computing device, such as a smartphone, tablet computer, laptop computer, VR or AR headset device, and the like. As such, the user device 700 can include typical telephony and/or tablet features such as a microphone 745, a camera 750, a satellite receiver 760, and a communication interface 710 to communicate with external entities using any number of wireless communication protocols. In certain aspects, the user device 700 can store a designated application (e.g., a service app 732) in a local memory 730. In variations, the memory 730 can store additional applications executable by one or more processors 740 of the user device 700, enabling access and interaction with one or more host servers over one or more networks 780.

In response to a user input 718 (e.g., search input), the service application 732 can interact with the computer system 700 to display an application interface 742 on a display screen 720 of the user device 700. When the user device 700 is used as a requester device, the application interface 742 can be used to display menu content 119, and enable the requester to make order requests from the network computing system 100.

Although examples are described in detail herein with reference to the accompanying drawings, it is to be understood that the concepts are not limited to those precise examples. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude having rights to such combinations.

What is claimed is:

1. A network computing system comprising:
one or more processors;
one or more memory resources to store a set of instructions that, when executed by the one or more processors, cause the network computing system to:
develop one or more predictive models of a plurality of predictive models using a machine learning process, wherein the machine learning process comprises training the one or more predictive models using real-time information and historical information, wherein the real-time information is obtained from at least one of a requester status store or a provider status store;
maintain the plurality of predictive models for estimating order preparation times by a plurality of suppliers, including a first predictive model that is specific to a first supplier of the plurality of suppliers and a second predictive model to predict provisioning level determinations,
wherein the provisioning level determinations reflect an adequacy of a number of a plurality of available service providers for handling a number of a plurality of order requests, and
wherein the provisioning level determinations comprise at least one of a number of active requesters that may come online in a given time interval, a conversion rate of the active requesters, or a number of order requests which can be generated from a population of users;
receive, over one or more networks, the plurality of order requests, each order request originating from a corresponding requester device and specifying one or more items requested to be transported from the first supplier to a corresponding requester;
for each of the plurality of order requests:
(i) perform a matching process to select a corresponding service provider from the plurality of available service providers to transport a corresponding delivery order from the first supplier to the corresponding requester,
wherein the matching process is performed at a time that is determined based on a predicted order preparation time for the order request computed using the first predictive model and a predicted provisioning level determination computed using the second predictive model such that the corresponding service provider is estimated to arrive at the first supplier within a designated threshold of the predicted order preparation time for the order request, wherein the first predictive model estimates the predicted order preparation time based on information for the corresponding service provider, the information being collected during a current order request session,
wherein the predicted provisioning level determination is based on information from the requester status store and the provider status store,
(ii) communicate with a corresponding provider device of the corresponding service provider to receive data regarding progress of the order request, and
(iii) communicate with a corresponding requester device of the corresponding requester to cause the corresponding requester device to present an order delivery time estimate that is determined based at least in part on the predicted order preparation time for the order request and an estimated trip time from a location of the first supplier to the corresponding requester.

2. The network computing system of claim 1, wherein the executed instructions further cause the network computing system to predict the predicted order preparation time for the order request by analyzing historical data for the first supplier.

3. The network computing system of claim 2, wherein the executed instructions further cause the network computing system to determine, from analyzing the historical data, a departure time of a service provider from the location of the first supplier for one or more prior delivery orders of the first supplier.

4. The network computing system of claim 3, wherein the executed instructions further cause the network computing system to determine one or more instances when a difference between an arrival time of the service provider at the location of the first supplier and the departure time of the service provider is indicative of the service provider having arrived before a respective delivery order of a respective order request was prepared.

5. The network computing system of claim 4, wherein the executed instructions further cause the network computing system to obtain, from the historical data, ground truth data for the order preparation time of the first supplier, based on the departure time of the service provider for the determined one or more instances.

6. The network computing system of claim 5, wherein the first predictive model for use in predicting the predicted order preparation time for the first supplier is developed based on the ground truth data.

7. The network computing system of claim 6, wherein the executed instructions further cause the network computing system to monitor the location of the service provider to determine a departure time for the service provider from the location of the first supplier, compare the departure time with the predicted order preparation time, and determine a feedback for the first predictive model based at least in part on the departure time.

8. The network computing system of claim 4, wherein the departure time is determined by location data communicated from a device of the respective service provider at the one or more instances.

9. The network computing system of claim 1, wherein the executed instructions further cause the network computing system to cause the requester device to display an interface that shows a progress of the delivery order for the requester's order request.

10. The network computing system of claim 1, wherein the executed instructions further cause the network computing system to repeatedly estimate the order delivery time during a set time interval for each of the plurality of order requests.

11. The network computing system of claim 1, wherein the information from the requester status store comprises at least one of a number of active requesters who have yet to make an order request, an amount of time the active requesters have spent viewing menu content for the plurality of suppliers, or the suppliers which were viewed by the active requesters, and wherein the information from the provider status store comprises at least one of a current location of respective providers, a service status of respective providers, or information identifying instances when respective providers had to wait before leaving a supplier.

12. The network computing system of claim 1, wherein the one or more predictive models comprises a conversion model, wherein the conversion model generates a forecast of a number of order requests based on real-time information, wherein the real-time information is obtained from the requester status store, and wherein data in the requester status store is indicative of a number of active users who have not yet made an order request.

13. A computer-implemented method, performed by one or more processors, comprising:
  developing one or more predictive models of a plurality of predictive models using a machine learning process, wherein the machine learning process comprises training the one or more predictive models using real-time information and historical information, wherein the real-time information is obtained from at least one of a requester status store or a provider status store;
  maintaining the plurality of predictive models for estimating order preparation times by a plurality of suppliers, including a first predictive model that is specific to a first supplier of the plurality of and a second predictive model to predict provisioning level determinations,
  wherein the provisioning level determinations reflect an adequacy of a number of a plurality of available service providers for handling a number of a plurality of order requests, and
  wherein the provisioning level determinations comprise at least one of a number of active requesters that may come online in a given time interval, a conversion rate of the active requesters, or a number of order requests which can be generated from a population of users;
  receiving, over one or more networks, the plurality of order requests, each order request originating from a corresponding requester device and specifying one or more items requested to be transported from the first supplier to a corresponding requester;
  for each of the plurality of order requests:
    (i) perform a matching process to select a corresponding service provider from the plurality of available service providers to transport a corresponding delivery order from the first supplier to the corresponding requester, wherein the matching process is performed at a time that is determined based on a predicted order preparation time for the order request computed using the first predictive model and a predicted provisioning level determination computed using the second predictive model such that the corresponding service provider is estimated to arrive at the first supplier within a designated threshold of the predicted order preparation time for the order request, wherein the first predictive model estimates the predicted order preparation time based on information for the corresponding service provider, the information being collected during a current order request session, wherein the predicted provisioning level determination is based on information from the requester status store and the provider status store,
    (ii) communicate with a corresponding provider device of the corresponding service provider to receive data regarding progress of the order request, and
    (iii) communicate with a corresponding requester device of the corresponding requester to cause the corresponding requester device to present an order delivery time estimate that is determined based at least in part on the predicted order preparation time for the order request and an estimated trip time from a location of the first supplier to the corresponding requester.

14. The method of claim 13, wherein predicting the predicted order preparation time for the order request includes analyzing historical data for the first supplier.

15. The method of claim 14, wherein predicting the predicted order preparation time for the order request includes determining, from analyzing the historical data, a departure time of a service provider from the location of the first supplier for one or more prior delivery orders of the first supplier.

16. The method of claim 15, further comprising:
  determining one or more instances when a difference between an arrival time of the service provider at the location of the first supplier and the departure time of the service provider is indicative of the service provider having arrived before a respective delivery order of a respective order request was prepared.

17. The method of claim 16, further comprising:
obtaining, from the historical data, ground truth data for the order preparation time of the first supplier, based on the departure time of the service provider for the determined one or more instances, wherein the first predictive model for use in predicting the predicted order preparation time for the first supplier is developed based on the ground truth data.

18. The method of claim 17, further comprising:
monitoring the location of the service provider to determine a departure time for the service provider from the location of the first supplier;
comparing the departure time with the predicted order preparation time; and
determining a feedback for the first predictive model based at least in part on the departure time.

19. The method of claim 16, further comprising:
determining the departure time using location data communicated from a device of the respective service provider at the one or more instances.

20. A non-transitory computer-readable medium that stores instructions, which when executed by one or more processors of a network computer system, cause the network computer system to perform operations that include:
developing one or more predictive models of a plurality of predictive models using a machine learning process, wherein the machine learning process comprises training the one or more predictive models using real-time information and historical information, wherein the real-time information is obtained from at least one of a requester status store or a provider status store;
maintaining the plurality of predictive models for estimating order preparation times by a plurality of suppliers, including a first predictive model that is specific to a first supplier of the plurality of and a second predictive model to predict provisioning level determinations,
wherein the provisioning level determinations reflect an adequacy of a number of a plurality of available service providers for handling a number of a plurality of order requests, and
wherein the provisioning level determinations comprise at least one of a number of active requesters that may come online in a given time interval, a conversion rate of the active requesters, or a number of order requests which can be generated from a population of users;
receiving, over one or more networks, the plurality of order requests, each order request originating from a corresponding requester device and specifying one or more items requested to be transported from the first supplier to a corresponding requester;
for each of the plurality of order requests:
 (i) perform a matching process to select a corresponding service provider from the plurality of available service providers to transport a corresponding delivery order from the first supplier to the corresponding requester,
  wherein the matching process is performed at a time that is determined based on a predicted order preparation time for the order request computed using the first predictive model and a predicted provisioning level determination computed using the second predictive model such that the corresponding service provider is estimated to arrive at the first supplier within a designated threshold of the predicted order preparation time for the order request, wherein the first predictive model estimates the predicted order preparation time based on information for the corresponding service provider, the information being collected during a current order request session,
  wherein the predicted provisioning level determination is based on information from the requester status store and the provider status store,
 (ii) communicate with a corresponding provider device of the corresponding service provider to receive data regarding progress of the order request, and
 (iii) communicate with a corresponding requester device of the corresponding requester to cause the corresponding requester device to present an order delivery time estimate that is determined based at least in part on the predicted order preparation time for the order request and an estimated trip time from a location of the first supplier to the corresponding requester.

* * * * *